(12) United States Patent
Koneru et al.

(10) Patent No.: US 12,130,847 B2
(45) Date of Patent: Oct. 29, 2024

(54) METHODS AND SYSTEMS FOR AMBIGUITY RESOLUTION IN CONVERSATIONS MANAGED BY A VIRTUAL ASSISTANT SERVER

(71) Applicant: Kore.ai, Inc., Orlando, FL (US)

(72) Inventors: Rajkumar Koneru, Windermere, FL (US); Prasanna Kumar Arikala Gunalan, Hyderabad (IN); Sri Vishnu Sankar Srinivasan, Chennai (IN); Girish Ahankari, Hyderabad (IN)

(73) Assignee: Kore.ai, Inc., Orlando, FL (US)

( * ) Notice: Subject to any disclaimer, the term of this patent is extended or adjusted under 35 U.S.C. 154(b) by 152 days.

(21) Appl. No.: 17/877,510

(22) Filed: Jul. 29, 2022

(65) Prior Publication Data
US 2024/0037128 A1    Feb. 1, 2024

(51) Int. Cl.
| G06F 16/332 | (2019.01) |
| G06F 9/451  | (2018.01) |
| G06F 16/31  | (2019.01) |
| G06F 16/33  | (2019.01) |
| G06F 16/338 | (2019.01) |

(52) U.S. Cl.
CPC .......... *G06F 16/3329* (2019.01); *G06F 9/453* (2018.02); *G06F 16/322* (2019.01); *G06F 16/3344* (2019.01); *G06F 16/338* (2019.01)

(58) Field of Classification Search
CPC .................................................. G06F 16/3329
See application file for complete search history.

(56) References Cited

U.S. PATENT DOCUMENTS

| 10,824,658 | B2  | 11/2020 | Bakis et al. |
| 2019/0103111 | A1 | 4/2019 | Tiwari et al. |
| 2020/0410012 | A1* | 12/2020 | Moon ..................... G06Q 10/04 |
| 2021/0133224 | A1 | 5/2021 | Tiwari et al. |
| 2023/0106590 | A1* | 4/2023 | Di Fabbrizio .......... G06N 20/00 705/26.63 |
| 2023/0205824 | A1* | 6/2023 | Jablokov ............. G06F 16/3329 707/737 |

OTHER PUBLICATIONS

Akbulut, B. Jan. 5, 2021, Prevent stuck conversations with disambiguation & suggestions, Medium. IBM Watson Assistant. Available at: https://medium.com/IBM-watson/prevent-stuck-conversations-with-disambiguation-suggestions-db4a40ee102f (Accessed: Jun. 28, 2021).

* cited by examiner

*Primary Examiner* — Van H Oberly
(74) *Attorney, Agent, or Firm* — Troutman Pepper Hamilton Sanders LLP

(57) ABSTRACT

A virtual assistant server extracts concept(s) from a received user query and correlates the extracted concept(s) to a plurality of nodes in a knowledge graph to identify qualifying path(s) in the knowledge graph. Further, when the two or more qualifying paths are identified, the virtual assistant server addresses one or more ambiguities in the knowledge graph by: prompting the user device to resolve a current one of the one or more ambiguities progressing from contextual nodes towards leaf nodes in the knowledge graph; receiving a response to the prompt from the user device; and repeating the prompting and the receiving until each of the one or more ambiguities is resolved and a matching path to the received query is identified. Finally, the virtual assistant server outputs content associated with a leaf node of the matched path to the user device.

22 Claims, 7 Drawing Sheets

FIG. 4

METHODS AND SYSTEMS FOR AMBIGUITY RESOLUTION IN CONVERSATIONS MANAGED BY A VIRTUAL ASSISTANT SERVER

FIELD

This technology generally relates to virtual assistants and, more particularly, to methods, systems, and computer-readable media for ambiguity resolution in conversations managed by a virtual assistant server.

BACKGROUND

Organizations use knowledge graphs to represent data such as key domain terms and associate them with context-specific frequently asked questions (FAQs), synonyms, and machine learning-enabled classes for use in services like search engines, virtual assistants, or question-answering services. A knowledge graph is a knowledge base that uses a graph-structured data model to ingest data. The knowledge graph is used to store interlinked descriptions of entities such as, for example, objects, events, or abstract concepts. The knowledge graph is composed of a list of paths, where each path comprises one or more entities and an intent. In one example, when an input is provided by a user to a virtual assistant, one or more matching paths from the list of paths of the knowledge graph corresponding to the virtual assistant are identified by considering a percentage match (e.g., ⅕, ⅖, . . . ) based on the number of nodes/terms in a path that match with the input provided.

Further, conventional approaches to knowledge graph-based question-answering services use a pipeline of machine learning models which require extensive training and maintenance. This approach has some drawbacks such as, for example, each machine learning model has to be trained, evaluated, and updated independently. Further, each machine learning model requires annotations for training, which are time-consuming and expensive. Thus, the machine learning based knowledge graphs require extensive training, maintenance, and may take longer training and maintenance times. Also, business users find it difficult to use the knowledge graphs if they are machine learning driven.

Furthermore, the conventional knowledge graph-based question-answering services are like fire-and-forget systems. For example, when an input is provided by the user, the question-answering service may respond to the user with an answer based on the knowledge graph search or may not provide any response when an ambiguity is encountered during the knowledge graph search, which may lead to user dissatisfaction. Hence there is a need for efficient knowledge graph construction and a method for efficient ambiguity resolution in conversations managed by a virtual assistant server.

SUMMARY

In an example, the present disclosure relates to a method for ambiguity resolution in a conversation managed by a virtual assistant server using a hierarchical knowledge graph. The method comprises extracting one or more concepts from a query received from a user device. Further, the one or more extracted concepts are correlated to one or more of a plurality of nodes comprising contextual nodes, intermediate nodes, and leaf nodes in the hierarchical knowledge graph. Further, based on the correlating the one or more extracted concepts to the one or more of the plurality of nodes, one or more qualifying paths are identified from one of the contextual nodes to one of the leaf nodes in the hierarchical knowledge graph. Further, when the two or more of the qualifying paths are identified, each of one or more ambiguities in the hierarchical knowledge graph are addressed by—prompting the user device to resolve a current one of the one or more ambiguities progressing from the contextual nodes towards the leaf nodes in the hierarchical knowledge graph, receiving a response to resolve the current one of the one or more ambiguities from the user device, and repeating the prompting and the receiving until each of the one or more ambiguities is resolved and one of the two or more of the qualifying paths is identified as a matching path to the received query. The one or more ambiguities comprise at least one of a conversation context which cannot be derived from two or more of the contextual nodes correlated to the one or more extracted concepts, or a selection which cannot be derived between two or more of the intermediate nodes or two or more of the leaf nodes correlated to the one or more extracted concepts. Subsequently, content associated with a leaf node of the matched path is output to the user device.

In another example, the present disclosure relates to a virtual assistant server comprising a processor and a memory. The memory coupled to the processor which is configured to execute programmed instructions stored in the memory to extract one or more concepts from a query received from a user device. Further, the one or more extracted concepts are correlated to one or more of a plurality of nodes comprising contextual nodes, intermediate nodes, and leaf nodes in a hierarchical knowledge graph. Further, based on correlating the one or more extracted concepts to the one or more of the plurality of nodes, one or more qualifying paths are identified from one of the contextual nodes to one of the leaf nodes in the hierarchical knowledge graph. Further, when the two or more of the qualifying paths are identified, each of one or more ambiguities in the hierarchical knowledge graph are addressed by— prompting the user device to resolve a current one of the one or more ambiguities progressing from the contextual nodes towards the leaf nodes in the hierarchical knowledge graph, receiving a response to resolve the current one of the one or more ambiguities from the user device, and repeating the prompting and the receiving until each of the one or more ambiguities is resolved and one of the two or more of the qualifying paths is identified as a matching path to the received query. The one or more ambiguities comprise at least one of a conversation context which cannot be derived from two or more of the contextual nodes correlated to the one or more extracted concepts, or a selection which cannot be derived between two or more of the intermediate nodes or two or more of the leaf nodes correlated to the one or more extracted concepts. Subsequently, content associated with a leaf node of the matched path is output to the user device.

In another example, the present disclosure relates to a non-transitory computer readable storage medium having stored thereon instructions which when executed by a processor, causes the processor to extract one or more concepts from a query received from a user device. Further, the one or more extracted concepts are correlated to one or more of a plurality of nodes comprising contextual nodes, intermediate nodes, and leaf nodes in a hierarchical knowledge graph. Further, based on correlating the one or more extracted concepts to the one or more of the plurality of nodes, one or more qualifying paths are identified from one of the contextual nodes to one of the leaf nodes in the hierarchical knowledge graph. Further, when the two or more of the qualifying paths are identified, each of one or more ambiguities in the hierarchical knowledge graph are addressed by—prompting the user device to resolve a current one of the one or more ambiguities progressing from the contextual nodes towards the leaf nodes in the hierarchical knowledge graph, receiving a response to resolve the current one of the one or more ambiguities from the user device, and repeating the prompting and the receiving until each of the one or more ambiguities is resolved and one of the two or more of the qualifying paths is identified as a matching path to the received query. The one or more ambiguities comprise at least one of a conversation context which cannot be derived from two or more of the contextual nodes correlated to the one or more extracted concepts, or a selection which cannot be derived between two or more of the intermediate nodes or two or more of the leaf nodes correlated to the one or more extracted concepts. Subsequently, content associated with a leaf node of the matched path is output to the user device.

In an example, the present disclosure relates to a method for ambiguity resolution in a conversation managed by a virtual assistant server using a data map corresponding to a hierarchical knowledge graph. The method comprises extracting one or more concepts from a query received from a user device. Further, the one or more extracted concepts are correlated to one or more of a plurality of nodes comprising contextual nodes, intermediate nodes, and leaf nodes in the data map corresponding to the hierarchical knowledge graph. Further, based on the correlating the one or more extracted concepts to the one or more of the plurality of nodes, one or more qualifying paths are identified from one of the contextual nodes to one of the leaf nodes in the data map. Further, when the two or more of the qualifying paths are identified, each of one or more ambiguities in the data map are addressed by—prompting the user device to resolve a current one of the one or more ambiguities progressing from the contextual nodes towards the leaf nodes in the data map, receiving a response to resolve the current one of the one or more ambiguities from the user device, and repeating the prompting and the receiving until each of the one or more ambiguities is resolved and one of the two or more of the qualifying paths is identified as a matching path to the received query. The one or more ambiguities comprise at least one of a conversation context which cannot be derived from two or more of the contextual nodes correlated to the one or more extracted concepts, or a selection which cannot be derived between two or more of the intermediate nodes or two or more of the leaf nodes correlated to the one or more extracted concepts. Subsequently, content associated with a leaf node of the matched path is output to the user device.

BRIEF DESCRIPTION OF THE DRAWINGS

FIG. 4 illustrates an exemplary data map corresponding to the knowledge graph illustrated in FIG. 3.

DESCRIPTION

Figure 1:
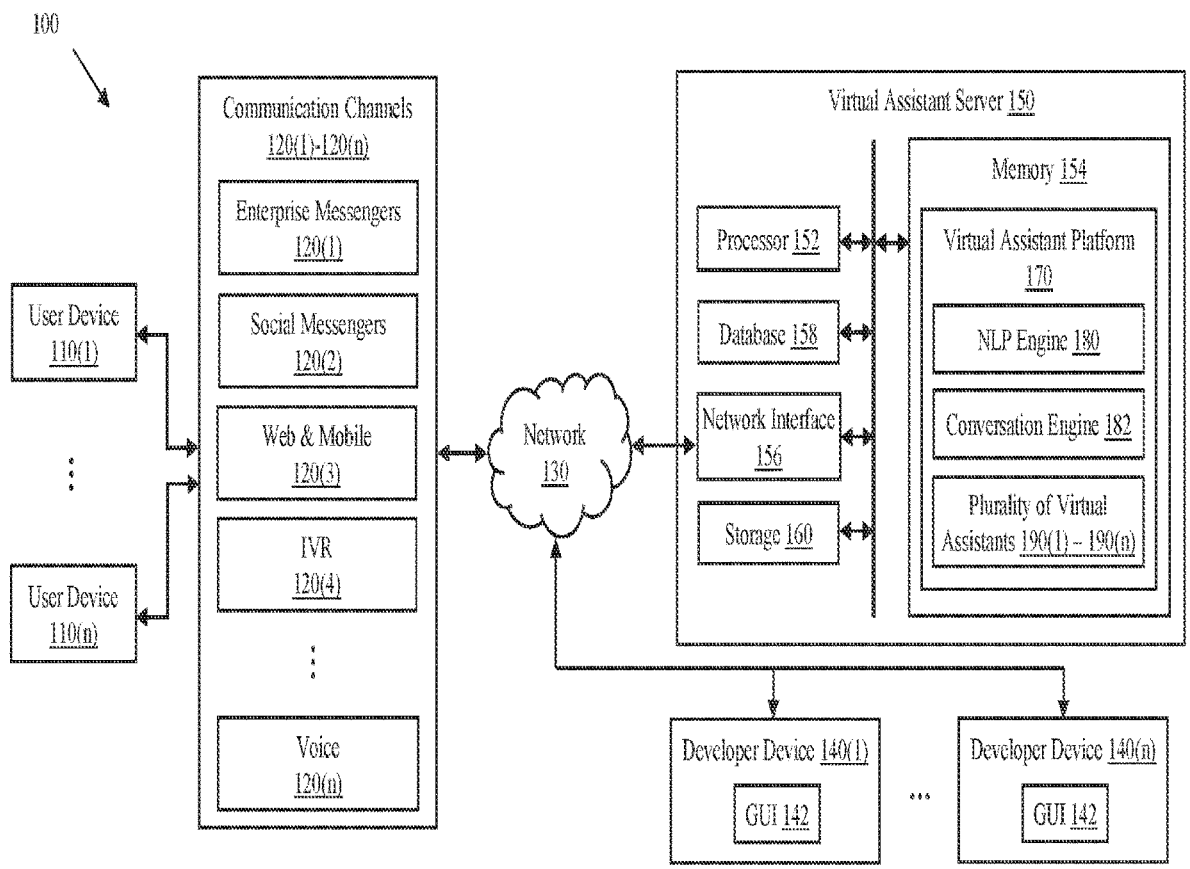
FIG. 1 is a block diagram of an exemplary system for implementing the methods and technologies disclosed herein.

The present disclosure relates to virtual assistants and, more particularly, to one or more components, systems, computer-readable media, and methods for ambiguity resolution in conversations managed by a virtual assistant server. FIG. 1 is a block diagram of an exemplary system for implementing the methods and technologies disclosed herein. The system 100 comprises: a plurality of user devices 110(1)-110(n), a plurality of communication channels 120(1)-120(n), a plurality of developer devices 140(1)-140(n), and a virtual assistant server 150 coupled together via a network 130, although the system 100 can comprise other types and numbers of systems, devices, components, and/or elements and in other topologies and deployments. Although not shown, the exemplary system 100 may comprise additional network components, such as routers, switches, and other devices, which are well known to those of ordinary skill in the art and thus will not be described here.

Referring to FIG. 1, the virtual assistant server 150 receives and handles a user query via voice or digital communication channels. The virtual assistant server 150 may use automation and artificial intelligence (e.g., virtual assistants) to address the user query. The virtual assistant server 150 comprises a processor 152, a memory 154, a network interface 156, a database 158 and a storage 160, although the virtual assistant server 150 may comprise other types and/or numbers of components in other configurations. In addition, the virtual assistant server 150 may comprise an operating system (not shown). In one example, the virtual assistant server 150 and/or processes performed by the virtual assistant server 150 may be implemented using a networking environment (e.g., cloud computing environment). In one example, the described methods that are performed by the virtual assistant server 150 may be offered as a service by the cloud computing environment.

The components of the virtual assistant server 150 may be coupled by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, a Small Computer Systems Interface (SCSI) bus, or a combination of two or more of these.

The processor 152 of the virtual assistant server 150 may execute one or more computer-executable instructions stored in the memory 154 for the methods illustrated and described with reference to the examples herein, although the processor 152 can execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations.

The memory 154 is an example of a non-transitory computer readable storage medium capable of storing information or instructions for the processor 152 to operate on.

The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a non-volatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may comprise other electronic, magnetic, optical, electromagnetic, infrared or semiconductor based non-transitory computer readable storage medium which may be used to tangibly store instructions, which when executed by the processor 152, perform the disclosed examples. The non-transitory computer readable storage medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1, the memory 154 may comprise instructions corresponding to a virtual assistant platform 170 of the virtual assistant server 150, although other types and/or numbers of instructions in the form of programs, functions, methods, procedures, definitions, subroutines, or modules may be stored. The virtual assistant server 150 receives communication in the form of a query from the user operating one of the plurality of user devices 110(1)-110(n) and uses the virtual assistant platform 170 to provide a response to the user operating one of the plurality of user devices 110(1)-110(n).

The network interface 156 may comprise hardware, software, or a combination of hardware and software, enabling the virtual assistant server 150 to communicate with the components illustrated in the system 100, although the network interface 156 may enable communication with other types and/or number of components in other configurations. In one example, the network interface 156 provides interfaces between the virtual assistant server 150 and the network 130. The network interface 156 may support wired or wireless communication. In one example, the network interface 156 may comprise an Ethernet adapter or a wireless network adapter to communicate with the network 130.

The plurality of user devices 110(1)-110(n) may communicate with the virtual assistant server 150 via the network 130. The users may access and interact with the functionalities exposed by the virtual assistant server 150 via the plurality of user devices 110(1)-110(n). The plurality of user devices 110(1)-110(n) may comprise any type of computing device that can facilitate user interaction, for example, a desktop computer, a laptop computer, a tablet computer, a smartphone, a mobile phone, a wearable computing device, or any other type of device with communication and data exchange capabilities. The plurality of user devices 110(1)-110(n) may comprise software and hardware capable of communicating with the virtual assistant server 150 via the network 130. Also, the plurality of user devices 110(1)-110(n) may render and display the information received from the virtual assistant server 150. In one example, the plurality of user devices 110(1)-110(n) may render an interface of any of the plurality of communication channels 120(1)-120(n) using which the users may communicate with the virtual assistant server 150. In another example, the plurality of user devices 110(1)-110(n) may render a graphical user interface of one or more of the plurality of virtual assistants 190(1)-190(n) with which the users may communicate. The plurality of user devices 110(1)-110(n) and the virtual assistant server 150 may communicate via one or more application programming interfaces (APIs) or one or more hyperlinks exposed by the virtual assistant server 150.

The users may communicate with the virtual assistant server 150 by providing text-based query or voice-based query via any of the plurality of communication channels 120(1)-120(n). The plurality of communication channels 120(1)-120(n) may comprise channels such as, for example, enterprise messengers 120(1) (e.g., Skype for Business, Microsoft Teams, Kore.ai Messenger, Slack, Google Hangouts, or the like), social messengers 120(2) (e.g., Facebook Messenger, WhatsApp Business Messaging, Twitter, Lines, Telegram, or the like), web & mobile 120(3) (e.g., a web application, a mobile application), interactive voice response (IVR) 120(4), voice channels 120(n) (e.g., Google Assistant, Amazon Alexa, or the like), live chat channels (e.g., LivePerson, LiveChat, Zendesk Chat, Zoho Desk, or the like), a webhook, a short messaging service (SMS), email, a software-as-a-service (SaaS) application, voice over internet protocol (VoIP) calls, computer telephony calls, or the like. The users may communicate with the virtual assistant server 150 via any of the plurality of communication channels 120(1)-120(n) using any of the plurality of user devices 110(1)-110(n) via the network 130. It may be understood that to support voice-based communication channels, the system 100 may comprise, for example, a public switched telephone network (PSTN), a voice server, a text-to-speech (TTS) engine, and an automatic speech recognition (ASR) engine, which are not illustrated in FIG. 1.

A plurality of enterprise users, hereinafter referred to as "developers", may operate the plurality of developer devices 140(1)-140(n) to interact with the virtual assistant server 150 via the network 130. In one example, the plurality of enterprise users may also comprise system administrator(s) of an enterprise. The developers may access the database 158, the storage 160, and the virtual assistant platform 170 via one or more application programming interfaces (APIs), one or more hyperlinks, or one or more uniform resource locators (URLs) using the plurality of developer devices 140(1)-140(n). The plurality of developer devices 140(1)-140(n) may be, for example, a desktop computer, a laptop computer, a tablet computer, a smartphone, a mobile phone, or any other type of device with communication and data exchange capabilities. Also, the developers may use virtual assistant building tools such as, for example, virtual assistant templates, language models, recommendations, or suggestions provided by the virtual assistant platform 170 via a virtual assistant builder graphical user interface (GUI) 142 rendered on the plurality of developer devices 140(1)-140(n) to design, test, deploy, monitor, and optimize one or more of the plurality of virtual assistants 190(1)-190(n). The plurality of developer devices 140(1)-140(n) may run applications such as web browsers, which may render the virtual assistant builder GUI 142, although other applications may render the virtual assistant builder GUI 142.

The plurality of user devices 110(1)-110(n) or the plurality of developer devices 140(1)-140(n) may comprise one or more processors, one or more memories, one or more input devices such as a keyboard, a mouse, a display device, a touch interface, and one or more communication interfaces, which may be coupled together by a bus or other link, although each may have other types and/or numbers of other systems, devices, components, and/or other elements.

The network 130 enables the plurality of user devices 110(1)-110(n), the plurality of developer devices 140(1)-140(n), or other such devices to communicate with the virtual assistant server 150. The network 130 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 130 may comprise other types and/or numbers of networks in other topologies or configurations.

The network 130 may support protocols such as, Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VoIP), although other types and/or numbers of protocols may be supported in other topologies or configurations. The network 130 may also support standards or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 may comprise any interface that is suitable to connect with any of the above-mentioned network types and communicate using any of the above-mentioned network protocols, standards, or formats.

The database 158 may store information related to nodes of a knowledge graph (i.e., concepts comprising entities and intents) and question-content pairs in the form of key-value pairs, although other types and/or numbers of information may be stored in other configurations. The information related to the nodes and question-content pairs may be stored in the database 158, for example, automatically by the virtual assistant platform 170, or manually by one or more developers via the virtual assistant builder GUI 142 rendered on one or more developer devices 140(1)-140(n). The information related to each node of the knowledge graph may comprise, for example, node name, display name, one or more synonyms, relationship data (e.g., parent node name to which the node is linked, one or more paths to which the node is associated with), one or more node names/synonyms that are tagged as "to be mandatorily detected in a user query" for identifying an intent, one or more questions and corresponding content associated with the node, etc. Further, one or more alternative forms of each question may also be stored in the database 158. In one example, the database 158 may be a cloud database, a distributed database, a relational database, an object-oriented database, a hierarchical database, or a NoSQL database, although other types and/or numbers of databases may be used in other configurations.

The database 158 may also store information corresponding to other configurations of the plurality of virtual assistants 190(1)-190(n).

Figure 3:
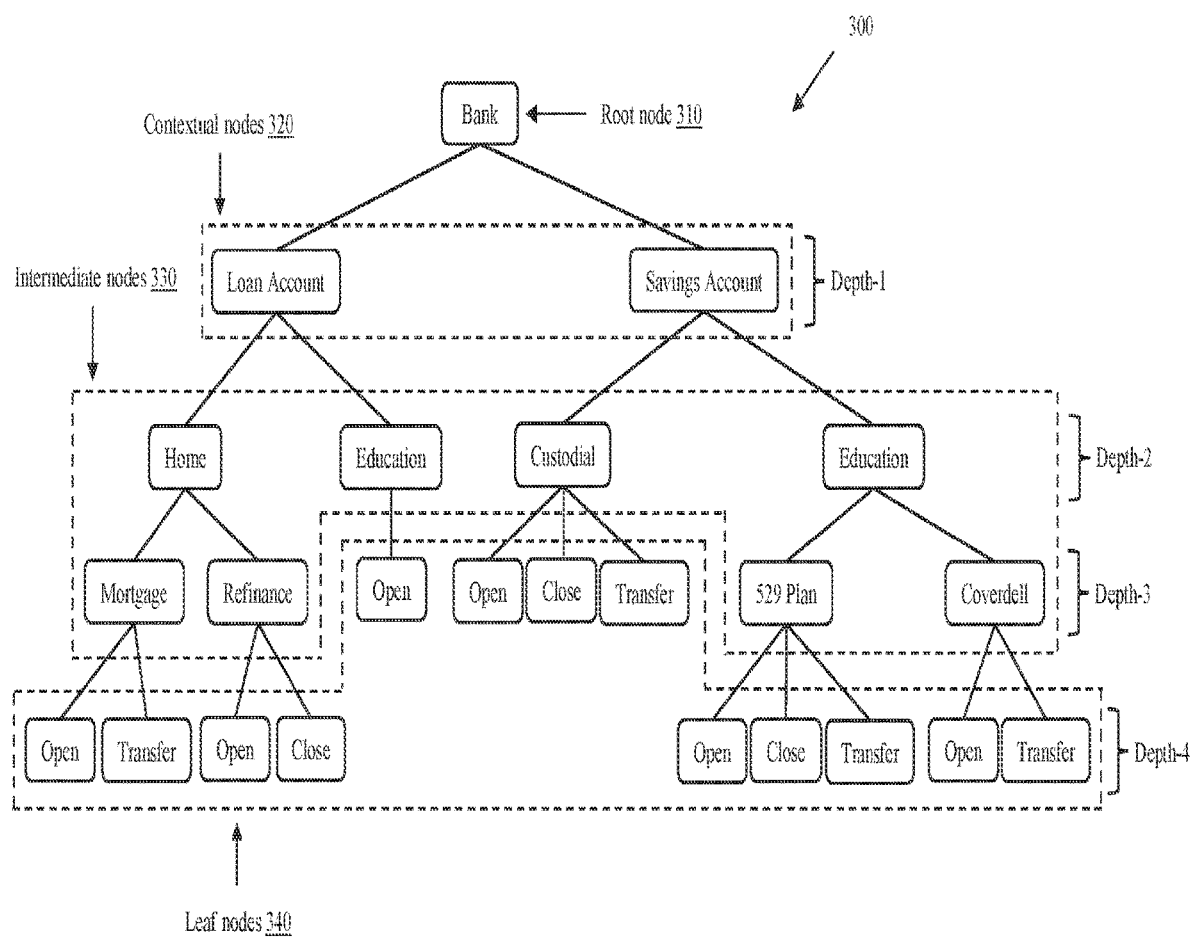
FIG. 3 is an example knowledge graph that may be used to respond to the user query received at the virtual assistant server.
Figure 4:
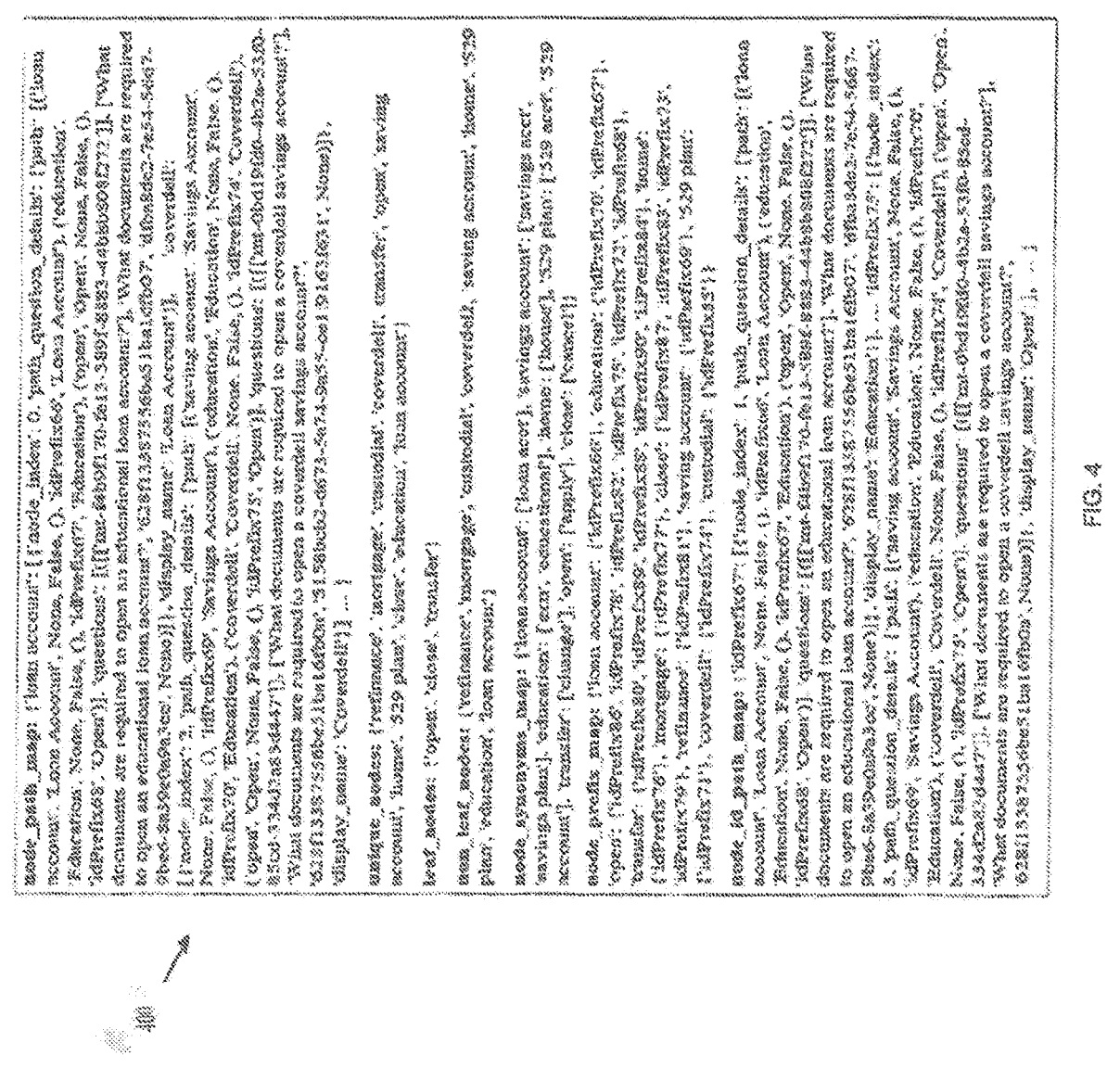

The storage 160 may comprise one or more permanent storage devices such as, for example, a hard disk drive (HDD), a solid-state drive (SSD), or cloud storage. It may be understood that the storage 160 may comprise other electronic, magnetic, optical, electromagnetic, infrared or semiconductor based non-transitory computer readable storage medium which may be used to tangibly store data, which may be accessed by the processor 152 while performing the disclosed method and examples. The non-transitory computer readable storage medium is not a transitory signal per se and is any tangible medium that contains and stores the data for use by or in connection with an instruction execution system, apparatus, or device. Examples of the data stored on the storage 160 are illustrated in FIGS. 3-4.

Further, the memory 154 may comprise the virtual assistant platform 170. The virtual assistant platform 170 may host a natural language processing (NLP) engine 180, a conversation engine 182, and a plurality of virtual assistants 190(1)-190(n) created, configured, or deployed by one or more developers or one or more system administrators, although the virtual assistant platform 170 may comprise other types and/or numbers of components in other configurations. The virtual assistant platform 170 manages and stores data or configuration corresponding to the plurality of virtual assistants 190(1)-190(n).

In an example, the developers may use virtual assistant building tools such as, for example, virtual assistant templates, language models, recommendations, or suggestions provided by the virtual assistant platform 170 via the virtual assistant builder GUI 142 rendered on the plurality of developer devices 140(1)-140(n) to design, train, test, deploy, monitor, and optimize the plurality of virtual assistants 190(1)-190(n). The plurality of virtual assistants 190(1)-190(n) may be designed based on artificial intelligence and machine learning (AI/ML) and configured to communicate with the users communicating via the plurality of user devices 110(1)-110(n). The virtual assistant server 150 may use the plurality of virtual assistants 190(1)-190(n) configured by the one or more developers to handle omni-channel conversations with the users operating the plurality of user devices 110(1)-110(n) via the plurality of communication channels 120(1)-120(n).

Each of the plurality of virtual assistants 190(1)-190(n) may comprise one or more rules, one or more conditions, one or more dialog flows, one or more knowledge graphs, a data map corresponding to each of the one or more knowledge graphs, one or more neural networks, one or more machine learning models, or one or more artificial intelligence-based definitions, models, or instructions. In one example, a developer using the virtual assistant builder GUI 142 may create a dialog flow for each intent of the plurality of virtual assistants 190(1)-190(n). Each dialog flow may comprise a network of nodes connected using one or more rules and one or more conditions that define a plurality of steps to be executed to fulfill the intent of the user. For example, a bank virtual assistant may comprise intents such as—open account, close account, check balance, transfer funds, block card, manage payee, etc., and the developer may create a separate dialog flow for each of these intents.

The virtual assistant server 150 hosts and manages the one or more knowledge graphs and the data map corresponding to each of the one or more knowledge graphs that are stored on the storage 160. Based on the user query received, the virtual assistant server 150 may execute a dialog flow, one of the one or more knowledge graphs, or one of the data maps associated with the virtual assistant 190(1) stored on the storage 160 to generate a response to the user query and output the response to one of the plurality of user devices 110(1)-110(n) operated by the user. The developer using the virtual assistant builder GUI 142 may enable and configure one or more of the plurality of communication channels 120(1)-120(n) for each of the plurality of virtual assistants 190(1)-190(n). The users, using one or more of the plurality of communication channels 120(1)-120(n), may communicate with the plurality of virtual assistants 190(1)-190(n) hosted or managed by the virtual assistant server 150. The user communication is routed via the network 130.

The conversation engine 182 orchestrates the conversations between the users and the virtual assistant server 150 by executing configurations of the plurality of virtual assistants 190(1)-190(n). The conversation engine 182 manages a context of a conversation between the user and the virtual assistant server 150. The conversation engine 182 may be implemented, for example, as a finite state machine that uses states and state information to orchestrate the conversation between the user and the virtual assistant server 150. Further, the conversation engine 182 may manage digressions or interruptions from the user during the conversation with the virtual assistant server 150.

Figure 2:
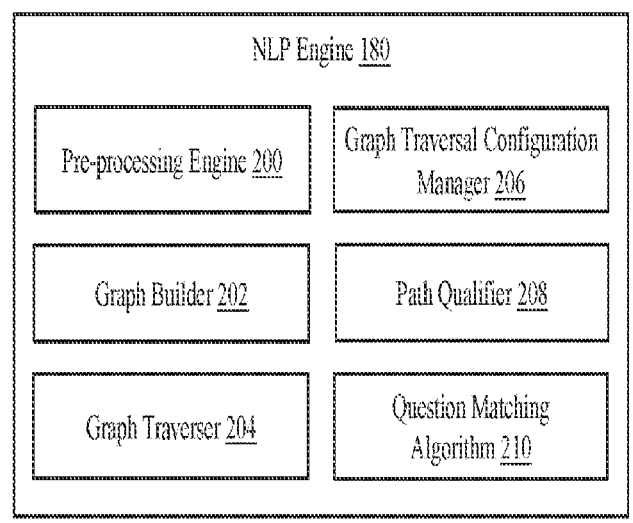
FIG. 2 is a block diagram of an exemplary natural language processing engine of a virtual assistant server illustrated in FIG. 1.

FIG. 2 is an exemplary block diagram of the NLP engine 180 of the virtual assistant platform 170. The NLP engine 180 comprises a pre-processing engine 200, a graph builder 202, a graph traverser 204, a graph traversal configuration manager 206, a path qualifier 208, and a question matching algorithm 210, although other types and/or components may be included in other configurations.

The pre-processing engine 200 may be used during design time and runtime of each of the plurality of virtual assistants 190(1)-190(n). During the design time of each of the plurality of virtual assistants 190(1)-190(n), the pre-processing engine 200 may perform necessary pre-processing operations on the ingested data (e.g., a plurality of frequently asked questions (FAQs) related to certain products or services) such as, for example, removing stop words, lemmatizing, stemming, or tokenizing, although other types and/or operations may be included in other configurations.

During the runtime of each of the plurality of virtual assistants 190(1)-190(n), the pre-processing engine 200 may perform necessary pre-processing operations on the query (e.g., text query or voice query) received by the virtual assistant server 150 from the user operating one of the plurality of user devices 110(1)-110(n). The pre-processing operations performed on the user query may comprise, for example, lemmatizing, stemming, concepts extraction, tokenizing, or generating n-grams, although other types and/or operations may be included in other configurations.

The graph builder 202 may generate an in-memory hierarchical graph, hereinafter referred to as "knowledge graph", by reading the information about the nodes and question-content pairs from the database 158. The knowledge graph comprises a plurality of nodes organized hierarchically in a plurality of paths. The graph builder 202 uses the relationship data of each node stored in the database 158 to represent hierarchical relationships between the plurality of nodes of the knowledge graph. In one example, the hierarchical relationships between the plurality of nodes of the knowledge graph are parent-child relationships. The parent-child relationships may be represented using, for example, pointers or references, although other techniques may be used to represent parent-child relationships. The graph builder 202 may also generate a visual representation of the knowledge graph which may be rendered in the virtual assistant builder GUI 142.

The plurality of nodes of the knowledge graph comprises a root node, contextual nodes, intermediate nodes, and leaf nodes. The leaf nodes are intents, and the contextual nodes and the intermediate nodes are the entities corresponding to the intents. The contextual nodes are the nodes that are directly attached to the root node which define the context of the one or more of the plurality of paths of the knowledge graph they are associated with. In one example, as part of the node information that is stored in the database 158, the developer may provide a contextual tag to each node which is directly connected to the root node. For each node of the knowledge graph, the graph builder 202 may tag display name and corresponding one or more synonyms based on the node information stored in the database 158.

Further, the graph builder 202 associates one or more questions to one or more of the plurality of nodes of the knowledge graph based on the question-content pairs information stored in the database 158. Further, the graph builder 202 may generate and assign a unique identifier to each node (i.e., node_id) of the plurality of nodes of the knowledge graph. The graph builder 202 may store the generated knowledge graph on the storage 160. An example knowledge graph corresponding to a bank virtual assistant is illustrated in FIG. 3.

In one example, when the database 158 comprises only question-content pairs information, the graph builder 202 may generate the knowledge graph by—automatically extracting concepts from the question-content pairs information stored in the database 158, defining relationships between the extracted concepts as a hierarchy of nodes, and associating the question-content pairs to the nodes.

After the knowledge graph is generated by the graph builder 202, the graph traverser 204 traverses the plurality of paths of the knowledge graph and generates a data map corresponding to the knowledge graph. The graph traverser 204 may be implemented using traversal algorithms such as, for example, a depth-first search (DFS) algorithm, a breadth-first search (BFS), level-order search algorithm, although other types and/or numbers of traversal algorithms may be used in other configurations. The graph traverser 204 may store the generated data map on the storage 160. The virtual assistant server 150 manages one or more knowledge graphs and a data map corresponding to each the one or more knowledge graphs that are stored on the storage 160. An example data map corresponding to the knowledge graph illustrated in FIG. 3 is illustrated in FIG. 4.

The graph traversal configuration manager 206 may be accessed by one or more developers from the virtual assistant builder GUI 142 rendered on one or more developer devices 140(1)-140(n) to configure traversal of the knowledge graph.

The path qualifier 208 of the NLP engine 180 may identify whether the user query matches a path of the plurality of paths, hereinafter referred to as "matching path". The path qualifier 208 correlates one or more concepts that are extracted from the user query with the plurality of nodes associated with the plurality of paths of the knowledge graph. In one example, the one or more extracted concepts are correlated to the plurality of nodes using techniques such as, probabilistic matching, a distance-based matching, a declarative matching rules with constraints, or any other text or string matching technique known in the art. The method employed by the path qualifier 208 for identifying the matching path of the knowledge graph is described in detail with examples in the description below.

FIG. 3 is an example hierarchical knowledge graph 300, hereinafter referred as "knowledge graph 300", configured for and associated with a bank virtual assistant. In one example, the knowledge graph 300 is configured by a developer. The knowledge graph 300 illustrates an exemplary hierarchical structure that may be used to respond to the user query received at the virtual assistant server 150. The knowledge graph 300 of FIG. 3 generated by the graph builder 202, illustrates a hierarchical structure of nodes (i.e., concepts comprising entities and intents) that may be used to respond to user's banking related queries received at the virtual assistant server 150. The knowledge graph 300 of FIG. 3 is illustrated with fewer nodes for simplicity, although the knowledge graph 300 may comprise more nodes. In this example, the bank virtual assistant is one of the plurality of virtual assistants 190(1)-190(n) hosted on and/or managed by the virtual assistant platform 170 of the virtual assistant server 150.

In the knowledge graph 300 of FIG. 3, the top node—"bank" is known as a root node 310, and all other nodes are connected either directly or indirectly to the root node 310. Below the root node 310 are contextual nodes 320—"loan account" and "savings account", which are directly connected to the root node 310 at a depth-1. The contextual nodes 320 are used to determine a type of bank account to respond to a user query. In this example knowledge graph 300, the contextual nodes 320 are at depth-1 from the root node 310, although the contextual nodes 320 may be at any other depth from the root node 310 in other configurations. Further, as shown in dotted boxes in the example in FIG. 3, at depth-2 from the root node 310 are intermediate nodes 330, at depth-3 from the root node 310 are the intermediate nodes 330 and leaf nodes 340, and at depth-4 from the root node 310 are the leaf nodes 340. All the nodes that are connected between the contextual nodes 320 and the leaf nodes 340 are the intermediate nodes 330. The leaf nodes 340 are the intents with responsive content, and the contextual nodes 320 and the intermediate nodes 330 are the entities corresponding to the intents. In one example, the developer may view the knowledge graph 300 in the GUI 142 and tag any of the plurality of nodes as the contextual nodes 320. The contextual nodes 320 enable the virtual assistant server 150 to identify a conversational context when the user starts a conversation with the virtual assistant server 150. The developer operating the developer device 140(1) may configure a traversal configuration of the knowledge graph 300. The traversal configuration may define that, for example, the nodes which cause the traversal ambiguity at a lower depth (depth-1<depth-2<depth-3<depth-4) from the root node 310 are prioritized over the nodes which cause the traversal ambiguity at a higher depth from the root node 310, while prompting the user operating the user device 110(1) for ambiguity resolution.

Further, the graph builder 202 may link one or more questions (not shown) along with one or more alternative forms and respective content to the leaf nodes 340 of the knowledge graph 300 based on the question-content pairs information stored in the database 158. For each node of the knowledge graph 300, the graph builder 202 may link the corresponding synonyms (not shown) that are, for example, provided by the developer and stored as part of the node information in the database 158.

FIG. 4 illustrates an exemplary data map 400 corresponding to the knowledge graph 300 that is illustrated in FIG. 3. The graph traverser 204 generates the data map 400 by traversing the knowledge graph 300 and determining paths associated with each node of the knowledge graph 300. The data map 400 may be used by the virtual assistant server 150 to—identify qualifying node(s) and qualifying path(s) based on the user query, determine which nodes to be prompted to the user to resolve a traversal ambiguity, identify a matching path between the qualifying path(s), and output a response to the user. The exemplary data map 400 of FIG. 4 includes, for example, the following mapping data:

a) node_path_map: this indicates the one or more paths of the knowledge graph 300 associated with each node of the knowledge graph 300 b) node_index: this indicates the index of each node associated with a given path, c) idPrefix: this indicates node_id of each node of the knowledge graph 300, for example, as shown in FIG. 4, 'idPrefix66' is the node_id of the node 'loan account', 'idPrefix69' is the node_id of the node 'savings account', 'idPrefix76' is the node_id of the node 'home', 'idPrefix71' is the node_id of the node '529 plan', d) path_question_details: this comprises one or more questions along with alternative forms (if provided by the developer) that are associated with a leaf node of each of the plurality of paths of the knowledge graph 300, and e) node_synonym_map: this comprises a list of one or more synonyms provided by the developer for one or more nodes of the knowledge graph 300.

For simplicity, only a part of the mapping data related to the data map 400 is described above, although the data map 400 of FIG. 4 may comprise other types of information. It may be understood that the above disclosed mapping data of the data map 400 is non-limiting, and other types and/or numbers of mapping data may be generated and included in the data map 400 in other configurations.

Figure 5:
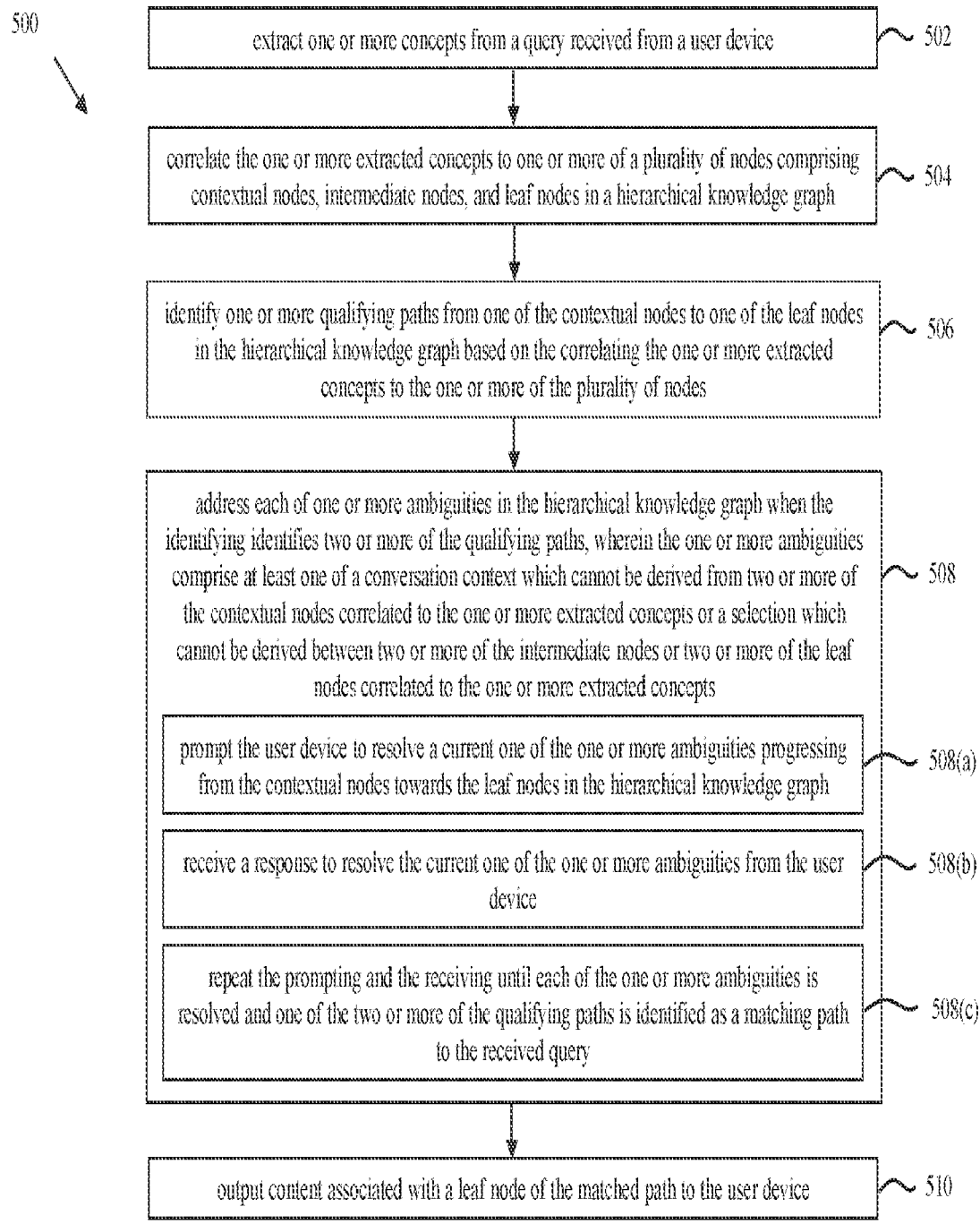
FIG. 5 is a flowchart of an exemplary method for responding to a user query received at the virtual assistant server.

FIG. 5 is a flowchart of an exemplary method 500 for ambiguity resolution in a conversation managed by a virtual assistant server 150 according to an example of the present disclosure. In FIG. 5, the ordering of steps is exemplary and other ordering may be possible, not all the steps may be required, and in some implementations, some steps may be omitted, or other steps may be added. The exemplary method 500 may be performed by the components illustrated in the system 100 of FIG. 1. In one example, a user operating a user device 110(1) may communicate with a virtual assistant 190(1) hosted or managed by the virtual assistant server 150. In this example, the virtual assistant 190(1) comprises the knowledge graph 300 created by the developer and managed by the virtual assistant server 150.

At step 502, the virtual assistant server 150 extracts one or more concepts from a query received from a user device 110(1) operated by the user as part of a conversation. For example, the query may be a text-based query or a voice-based query. The user operating the user device 110(1) may communicate with the virtual assistant 190(1) of the virtual assistant server 150 via one of the plurality of communication channels 120(1)-120(n). A concept may be a single word or a sequence of two or more words that represent an entity or entities, an idea, a concept, or an intent of the user. The one or more concepts from the query may be extracted using techniques such as, for example, token extraction techniques, n-grams generation techniques, word embedding techniques (e.g., one hot encoding, term frequency-inverse document frequency (TF-IDF), Word2Vec, FastText), although other types and/or numbers of techniques may be used in other configurations.

In this example, an n-grams generation technique is used for extracting concepts from the query. An n-gram is a continuous sequence of n items (e.g., words, symbols, or tokens) from a given sample of text or speech. In one example, the virtual assistant server 150 may initially extract one or more tokens from the query and then generate one or more n-grams from the extracted one or more tokens. The one or more n-grams may be generated, for example, using any of the n-gram generation models or algorithms known to a person having ordinary skill in the art.

At step 504, the virtual assistant server 150 correlates the one or more extracted concepts to one or more of a plurality of nodes comprising the contextual nodes 320, the intermediate nodes 330, and the leaf nodes 340 in the knowledge graph 300. The virtual assistant server 150 traverses the knowledge graph 300 by correlating the one or more extracted concepts to the one or more of a plurality of nodes of the knowledge graph 300 to determine an intent of the query and extract one or more entities from the query that are required to fulfill the intent. In one example, instead of traversing the knowledge graph 300 of the virtual assistant 190(1), the virtual assistant server 150 may retrieve and use the data map 400 corresponding to the knowledge graph 300 of the virtual assistant 190(1) stored on the storage 160 to respond to the query.

The knowledge graph 300 and the data map 400 corresponding to the knowledge graph 300 stored on the storage 160 may be used as backup for each other. For example, if the data map 400 stored on the storage 160 is corrupt, the virtual assistant server 150 may use the knowledge graph 300 for responding to the query or vice versa. This reduces the down time of the virtual assistant server 150.

The following examples describe different knowledge graph traversal scenarios executed by the virtual assistant server 150:

Example-1: If the virtual assistant 190(1) comprises only one knowledge graph 300 stored on the storage 160, the virtual assistant server 150 may retrieve the knowledge graph 300 from the storage 160 and traverse the knowledge graph 300 by correlating the one or more extracted concepts from the query with the plurality of nodes corresponding to the plurality of paths of the knowledge graph 300.

Example-2: If the virtual assistant 190(1) comprises two or more knowledge graphs stored on the storage 160, the virtual assistant server 150 may retrieve the two or more knowledge graphs from the storage 160. Further, the virtual assistant server 150 may traverse each of the two or more knowledge graphs by correlating the one or more extracted concepts from the query with the plurality of nodes corresponding to the plurality of paths of each of the two or more knowledge graphs of the virtual assistant 190(1). The virtual assistant server 150 may identify which of the two or more knowledge graphs of the virtual assistant 190(1) has the highest number of nodes correlating to the extracted concepts for further traversal.

Example-3: Each of the two or more knowledge graphs of the virtual assistant 190(1) that are stored on the storage 160 may have one or more mandatory terms (e.g., node name, synonym(s) of the node name) tagged as "to be mandatorily detected in a user query" to retrieve and traverse a corresponding knowledge graph. In this example, to identify a matching knowledge graph between the two or more knowledge graphs, the virtual assistant server 150 correlates the one or more extracted concepts from the query with the one or more mandatory terms of each of the two or more knowledge graphs.

Example-3 (continued): The knowledge graph of the virtual assistant 190(1) in which at least one of the mandatory terms correlate with the one or more concepts extracted from the query is considered as the matching knowledge graph by the virtual assistant server 150. Further, the virtual assistant server 150 retrieves and traverses the matching knowledge graph to respond to the query. Further, as specific term(s) of the knowledge graph are tagged as "to be mandatorily detected in a user query", the virtual assistant server 150 will not retrieve and traverse the knowledge graph unless the one or more extracted concepts from the query correlate to the specific term(s) of the knowledge graph that are tagged as mandatory. This reduces—processor execution cycles, processor power consumption, false positives for the terms tagged as mandatory. This in turn enables quick intent identification with reduced false positives and false negatives.

The following examples describe different data map usage scenarios executed by the virtual assistant server 150:

Example-4: If only one data map 400 corresponding to the knowledge graph 300 of the virtual assistant 190(1) is stored on the storage 160, the virtual assistant server 150 may retrieve the data map 400 from the storage 160 and correlate the one or more extracted concepts from the query with the plurality of nodes corresponding to the plurality of paths listed in the data map 400.

Example-5: If two or more data maps corresponding to two or more knowledge graphs of the virtual assistant 190(1) are stored on the storage 160, the virtual assistant server 150 may retrieve the two or more data maps from the storage 160. Further, the virtual assistant server 150 correlates the one or more extracted concepts from the query with the plurality of nodes corresponding to the plurality of paths listed in each of the two or more data maps. The virtual assistant server 150 identifies a matching data map of the two or more data maps that has the highest number of nodes correlating to the extracted concepts from the query for further traversal.

Example-6: Each of two or more data maps corresponding to two or more knowledge graphs of the virtual assistant 190(1) that are stored on the storage 160 may have one or more mandatory terms (e.g., node name, synonym(s) of the node name) tagged as "to be mandatorily detected in a user query" to retrieve and traverse a corresponding data map. In this example, to identify a matching data map between the two or more data maps, the virtual assistant server 150 correlates the one or more extracted concepts from the query with the one or more mandatory terms of each of the two or more data maps.

Example-6 (continued): The data map in which at least one of the mandatory terms correlate to the one or more extracted concepts from the query is considered as the matching data map by the virtual assistant server 150 to respond to the query. Further, as specific term(s) of the data map are tagged as "to be mandatorily detected in a user query", the virtual assistant server 150 will not retrieve and search the data map unless the one or more extracted concepts from the query correlate to the specific term(s) of the data map that are tagged as mandatory. This reduces—processor execution cycles, processor power consumption, false positives for the terms tagged as mandatory. This in turn enables quick intent identification with reduced false positives and false negatives.

Referring back to FIG. 5, at step 506, the virtual assistant server 150 identifies one or more qualifying paths from one of the contextual nodes 320 to one of the leaf nodes 340 in the knowledge graph 300 based on the correlating the one or more extracted concepts to the one or more of the plurality of nodes. For example, the identified one or more qualifying paths comprises nodes that correlate to all of the one or more extracted concepts.

At step 508, the virtual assistant server 150 addresses each of one or more ambiguities in the knowledge graph 300 when the identifying identifies two or more of the qualifying paths, wherein the one or more ambiguities comprise at least one of a conversation context which cannot be derived from two or more of the contextual nodes 320 correlated to the one or more extracted concepts or a selection which cannot be derived between two or more of the intermediate nodes 330 or two or more of the leaf nodes 340 correlated to the one or more extracted concepts. Further, for addressing each of the one or more ambiguities in the knowledge graph 300, at step 508(a), the virtual assistant server 150 prompts the user device 110(1) to resolve a current one of the one or more ambiguities progressing from the contextual nodes 320 towards the leaf nodes 340 in the knowledge graph 300.

For example, each of the identified two or more qualifying paths comprises nodes correlating with all of the one or more extracted concepts from the query and one or more nodes not correlating with any of the one or more extracted concepts from the query that cause the traversal ambiguity between the identified two or more qualifying paths. In one example, the one or more nodes causing the traversal ambiguity between the identified two or more qualifying paths of the knowledge graph 300 may comprise the contextual nodes 320, one or more of the intermediate nodes 330, or one or more of the leaf nodes 340 of the identified two or more qualifying paths.

For the virtual assistant server 150, deriving the conversational context from the query is an important parameter to handle and manage the conversation with the user. The conversational context derived from the query may be used by the virtual assistant server 150 to streamline the traversal of the knowledge graph 300 and efficiently resolve ambiguities during the traversal of the knowledge graph 300. Also, deriving the conversational context first may advantageously reduce the number of prompts required to resolve an ambiguity and thus improve the time required to resolve the ambiguity. Hence, the virtual assistant server 150 initially derives the conversational context. Thus, the contextual nodes 320 will be prioritized over the ambiguity causing intermediate nodes 330 or the leaf nodes 340 while prompting the user operating the user device 110(1) to resolve traversal ambiguity. In one example, if one or more extracted concepts from the query do not correlate to any of the contextual nodes 320 of the identified two or more qualifying paths of the knowledge graph 300 or the conversational context is not implicitly derived from the identified two or more qualifying paths, then the contextual nodes 320 are prioritized over other ambiguity causing nodes of the knowledge graph 300 and the contextual nodes 320 are prompted to the user operating the user device 110(1) to determine the conversational context and/or resolve the traversal ambiguity.

In another example, if one or more extracted concepts from the query correlate to any of the contextual nodes 320 of the identified two or more qualifying paths or the conversational context is implicitly derived from the identified two or more qualifying paths, then the intermediate nodes 330 or the leaf nodes 340 of the identified two or more qualifying paths causing the traversal ambiguity are prompted to the user operating the user device 110(1) to resolve the traversal ambiguity.

The nodes may be prompted to the user operating the user device 110(1) in the form of, for example, radio buttons, voice prompts, plain text, or multiple-choice options, although other types and/or numbers of prompting techniques may be used in other configurations. Also, the form in which the prompts are prompted to the user operating the user device 110(1) may be specific to a communication channel used by the user. In one example, for a chat-based communication channel, the nodes may be prompted in the form of radio buttons. In another example, for an SMS-based communication channel, the nodes may be prompted in the form of multiple-choice options.

At step 508(b), the virtual assistant server 150 receives a response to the prompt to resolve the current one of the one or more ambiguities from the user device 110(1). The response to the prompt from the user operating the user device 110(1) may be, for example, the user selecting a radio button, the user typing the intended node name, the user voice inputting the intended node name, or the user inputting the option number corresponding to the intended node name. Further, after receiving the response to the prompt to resolve the current one of the one or more ambiguities from the user device 110(1), the virtual assistant server 150 traverses the knowledge graph 300 based on the response to the prompt.

At step 508(c), after receiving the response from the user device 110(1), the virtual assistant server 150 repeats the prompting step 508(a) and the receiving step 508(b) until each of the one or more ambiguities is resolved and one of the two or more of the qualifying paths is identified as a matching path to the received query. The matching path is identified based on correlating the one or more extracted concepts to the plurality of nodes in the knowledge graph 300 and the response received from the user device 110(1) after each prompt.

At step 510, the virtual assistant server 150 outputs content associated with a leaf node at the end of the matched path to the user device 110(1). Each of the leaf nodes 340 may be associated with one or more question-content pairs. The content of the one or more question-content pairs may comprise, for example, an answer, a document, an image, a hyperlink, although other types and/or numbers of information may be available in other configurations. In one example, if the leaf node of the identified matching path is associated with one question-content pair, then the virtual assistant platform 170 of the virtual assistant server 150 outputs the content of the question-content pair as a response to the user operating the user device 110(1). In another example, if the leaf node of the identified matching path is associated with a plurality of question-content pairs, the question matching algorithm 210 scores a plurality of questions of the plurality of question-content pairs associated with the leaf node of the matching path against the query and the response received from the user device 110(1) after each prompt, to identify one or more matching questions. The virtual assistant platform 170 of the virtual assistant server 150 may then output the content corresponding to each of the one or more matching questions as a response to the user operating the user device 110(1).

Figure 6A:
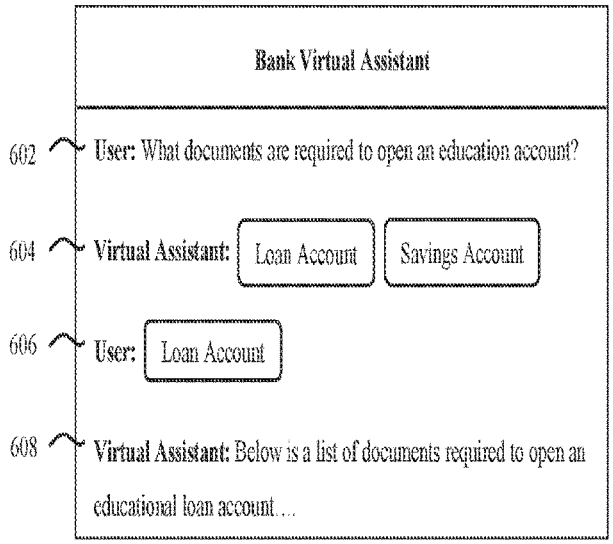
FIGS. 6A-6D illustrate example conversations between the user and a bank virtual assistant.
Figure 6B:
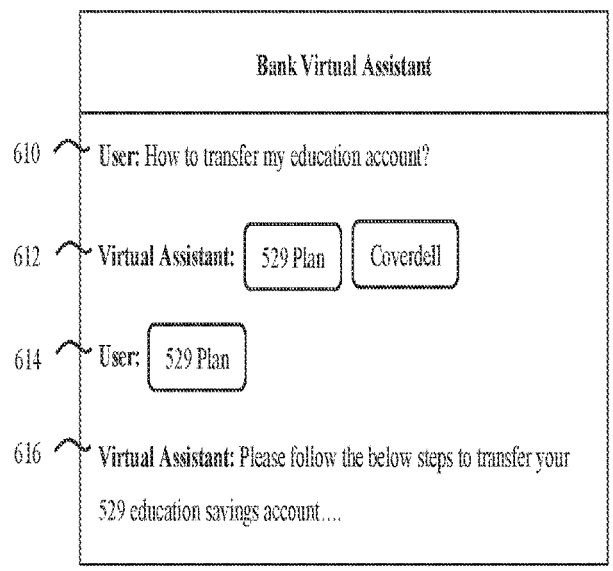
Figure 6C:
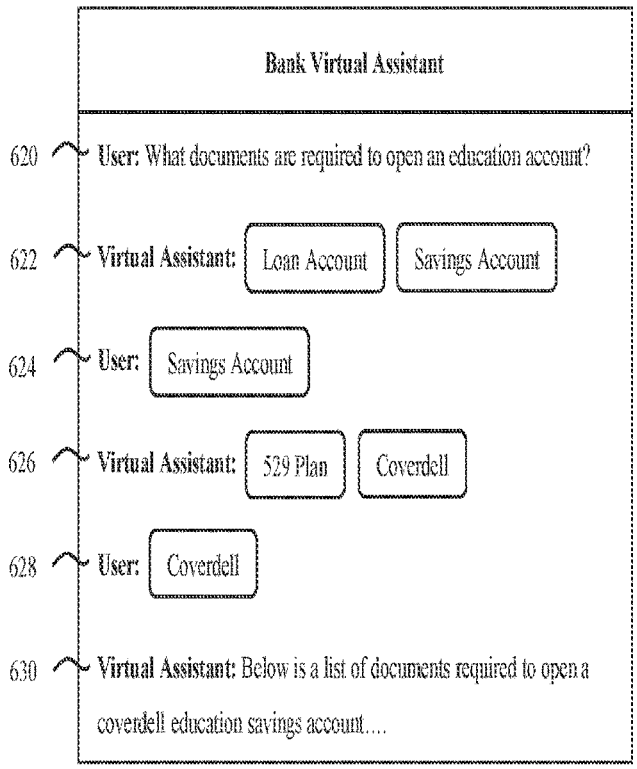
Figure 6D:
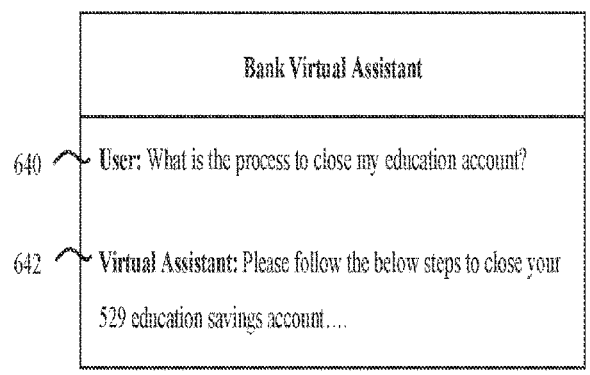

FIGS. 6A-6D illustrate example conversations between the user operating the user device 110(1) and the bank virtual assistant of the plurality of virtual assistants 190(1)-190(n)

of the virtual assistant server 150. In the illustrated examples of FIGS. 6A-6D, the virtual assistant 190(1) is configured as a bank virtual assistant. FIGS. 6A and 6B illustrate example conversations between the user operating the user device 110(1) and the bank virtual assistant, in which a single traversal ambiguity resolution results in identifying a matching path and a content to the user query. FIG. 6C illustrates an example conversation between the user operating the user device 110(1) and the bank virtual assistant, in which multiple traversal ambiguity resolutions are required to identify the matching path and the content to the user query. FIG. 6D illustrates an example conversation between the user operating the user device 110(1) and the bank virtual assistant, in which there is no traversal ambiguity, and content is directly provided to the user query.

In one example, the knowledge graph 300 is configured for the bank virtual assistant and stored on the storage 160 may be used by the virtual assistant server 150 to respond to the user query related to banking.

In another example, the data map 400 corresponding to the knowledge graph 300 of the bank virtual assistant that is stored on the storage 160 may be accessed by the virtual assistant server 150 to respond to the user query related to banking. The data map 400 may be accessed by the virtual assistant server 150, for example, using key-value pairs. For example, referring back to FIG. 4, the data map 400 may be accessed using a key—node_id (e.g., idPrefix71), and all the values (e.g., one or more paths of the knowledge graph 300) to which the node_id—'idPrefix71' is associated are retrieved. In this example, the 'idPrefix71' is the id of the node '529 plan' and the one or more paths (retrieved using 'node_path_map' or 'node_id_path_map') of the knowledge graph 300 to which the node_id—'idPrefix71' is associated with are retrieved.

Further, using the data map 400 instead of the knowledge graph 300 for responding to the user query, reduces reconstruction time of the knowledge graph 300, traversal time of the knowledge graph 300, and response time to the user query, which in turn reduces—number of memory access cycles, number of processor execution cycles, and power consumption of memory and processor of the virtual assistant server 150.

In the example conversation of FIG. 6A, the user operating the user device 110(1) when communicating with the bank virtual assistant provides a query 602—"What documents are required to open an education account?". The virtual assistant server 150 extracts the concepts "open" and "education" from the query 602. The virtual assistant server 150 retrieves the knowledge graph 300 of the bank virtual assistant that is stored on the storage 160 and traverses the knowledge graph 300 by correlating the extracted concepts (i.e., "open" and "education") from the query 602 with the plurality of nodes corresponding to the plurality of paths of the knowledge graph 300. In this example, "open" and "education" are the concepts that are extracted from the query 602 using n-grams generation. Further, the virtual assistant server 150 identifies three qualifying paths between the plurality of paths of the knowledge graph 300 based on the correlation of the extracted concepts (i.e., "open" and "education") with each node of the plurality of paths of the knowledge graph 300. With reference to FIG. 3, in this example, the identified three qualifying paths of the plurality of paths of the knowledge graph 300 are:

1) Bank→Loan Account→Education→Open
2) Bank→Savings Account→Education→529 Plan→Open
3) Bank→Savings Account→Education→Coverdell→Open Further, with reference to FIG. 3, in this example, the extracted concepts (i.e., "open" and "education") from the query 602 do not correlate to any of the contextual nodes 320 (i.e., "loan account" and "savings account"). The virtual assistant server 150 cannot derive the conversational context from the query 602 or the above identified three qualifying paths because of an ambiguity between the contextual nodes 320. Further, as the extracted concepts did not correlate to any of the contextual nodes 320 and the conversational context is not derived, the virtual assistant server 150 prioritizes the contextual nodes 320 ("loan account" and "savings account") causing a traversal ambiguity between the above identified three qualifying paths and prompts the contextual nodes 320 to the user operating the user device 110(1) to determine the conversational context and resolve the traversal ambiguity. As illustrated in FIG. 6A, the virtual assistant server 150 provides to the user a prompt 604 comprising the contextual nodes 320 of the above identified three qualifying paths to determine the conversational context and resolve the traversal ambiguity. In this example, the contextual nodes 320 are prompted to the user in the form of radio buttons, as illustrated in the prompt 604 of FIG. 6A.

The user operating the user device 110(1) selects the radio button "loan account" as a response 606 to the prompt 604. Based on the response 606 received from the user operating the user device 110(1), the virtual assistant server 150 identifies a matching path—Bank→Loan Account→Education→Open, between the above identified three qualifying paths. Finally, the virtual assistant server 150 outputs content 608—"Below is a list of documents required to open an educational loan account . . . ", associated with the leaf node—"open" of the matching path to the user operating the user device 110(1).

In the example conversation of FIG. 6B, the user operating the user device 110(1) when communicating with the bank virtual assistant provides a query 610—"How to transfer my education account?". The virtual assistant server 150 extracts the concepts "transfer" and "education" from the query 610. The virtual assistant server 150 retrieves the knowledge graph 300 of the bank virtual assistant that is stored on the storage 160 and traverses the knowledge graph 300 by correlating the concepts extracted (i.e., "transfer" and "education") from the query 610 with the plurality of nodes corresponding to the plurality of paths of the knowledge graph 300. In this example, "transfer" and "education" are the concepts that are extracted from the query 610 using n-grams generation. Further, the virtual assistant server 150 identifies two qualifying paths between the plurality of paths of the knowledge graph 300 based on the correlation of the extracted concepts (i.e., "transfer" and "education") with each node of the plurality of paths of the knowledge graph 300. With reference to FIG. 3, in this example, the identified two qualifying paths of the plurality of paths of the knowledge graph 300 are:

1) Bank→Savings Account→Education→529 Plan→Transfer
2) Bank→Savings Account→Education→Coverdell→Transfer In this example, as the extracted concepts (i.e., "transfer" and "education") do not correlate to any of the contextual nodes 320 of the knowledge graph 300, the virtual assistant server 150 cannot directly derive the conversational context from the query 610. The above identified two qualifying paths comprise only one of the contextual nodes 320 (i.e., savings account). Thus, the virtual assistant server 150 implicitly derives the conversational context—"savings account" from the above identified two qualifying paths. In the identified two qualifying paths, the virtual assistant server 150 correlated the nodes "transfer", "education", and implicitly derived the node—"savings account". The virtual assistant server 150 needs to choose between the nodes "529 plan" and "coverdell" to identify a matching path of the two qualifying paths. As a result, the virtual assistant server 150 determines that the intermediate nodes—"529 plan" and "coverdell" are causing the traversal ambiguity between the above identified two qualifying paths. The virtual assistant server 150 prompts the user operating the user device 110(1) the traversal ambiguity causing intermediate nodes—"529 plan" and "coverdell". As illustrated in FIG. 6B, the virtual assistant server 150 provides to the user a prompt 612 comprising the intermediate nodes—"529 plan" and "coverdell" to resolve the traversal ambiguity. In this example, the intermediate nodes—"529 plan" and "coverdell" are prompted to the user in the form of radio buttons, as illustrated in the prompt 612 of FIG. 6B.

The user operating the user device 110(1) selects the radio button "529 plan" as a response 614 to the prompt 612. Based on the response 614 received from the user operating the user device 110(1), the virtual assistant server 150 identifies a matching path—Bank→Savings Account→Education→529 Plan→Transfer, between the above identified two qualifying paths. Finally, the virtual assistant server 150 outputs content 616—"Please follow the below steps to transfer your 529 education savings account . . . ", associated with the leaf node—"transfer" of the matching path to the user operating the user device 110(1).

In the example conversation of FIG. 6C, the user operating the user device 110(1) when communicating with the bank virtual assistant provides a query 620—"What documents are required to open an education account?". The virtual assistant server 150 extracts the concepts "open" and "education" from the query 620. The virtual assistant server 150 retrieves the knowledge graph 300 of the bank virtual assistant that is stored on the storage 160 and traverses the knowledge graph 300 by correlating the concepts extracted (i.e., "open" and "education") from the query 620 with the plurality of nodes corresponding to the plurality of paths of the knowledge graph 300. In this example, "open" and "education" are the concepts extracted from the query 620 using n-grams generation. Further, the virtual assistant server 150 identifies three qualifying paths between the plurality of paths of the knowledge graph 300 based on the correlation of the extracted concepts (i.e., "open" and "education") with each node of the plurality of paths of the knowledge graph 300. With reference to FIG. 3, in this example, the identified three qualifying paths of the plurality of paths of the knowledge graph 300 are:
1) Bank→Loan Account→Education→Open
2) Bank→Savings Account→Education→529 Plan→Open
3) Bank→Savings Account→Education→Coverdell→Open In this example, as the extracted concepts (i.e., "open" and "education") from the query 620 do not correlate to any of the contextual nodes 320 of the knowledge graph 300, the virtual assistant server 150 cannot directly derive the conversational context from the query 620. Also, as the above identified three qualifying paths together comprise both the contextual nodes 320 that are causing a traversal ambiguity, the virtual assistant server 150 cannot derive the conversational context from the identified three qualifying paths. Thus, the virtual assistant server 150 prioritizes the contextual nodes 320 ("loan account" and "savings account") causing the traversal ambiguity between the above identified three qualifying paths and prompts the contextual nodes 320 to the user operating the user device 110(1). As illustrated in FIG. 6C, the virtual assistant server 150 provides to the user a prompt 622 comprising the contextual nodes 320 of the above identified three qualifying paths to resolve the traversal ambiguity. In this example, the contextual nodes 320 are prompted to the user in the form of radio buttons, as illustrated in the prompt 622 of FIG. 6C.

Further, the user operating the user device 110(1) selects the radio button "savings account" as a response 624 to the prompt 622. Based on the response 624 received from the user operating the user device 110(1), the virtual assistant server 150 identifies that there is a further traversal ambiguity between the following two paths of the knowledge graph 300:
 a) Bank→Savings Account→Education→529 Plan→Open
 b) Bank→Savings Account→Education→Coverdell→Open In the identified two qualifying paths, the virtual assistant server 150 correlated the nodes "open", "education", and the derived contextual node—"savings account" from the response 624. The virtual assistant server 150 needs to choose between the nodes "529 plan" and "coverdell" to identify a matching path of the two qualifying paths. As a result, the virtual assistant server 150 determines that the intermediate nodes—"529 plan" and "coverdell" are causing the traversal ambiguity between the above identified two qualifying paths. The virtual assistant server 150 prompts the user operating the user device 110(1) the traversal ambiguity causing intermediate nodes—"529 plan" and "coverdell". As illustrated in FIG. 6C, the virtual assistant server 150 provides to the user a prompt 626 comprising the intermediate nodes—"529 plan" and "coverdell" to resolve the traversal ambiguity. In this example, the intermediate nodes—"529 plan" and "coverdell" are prompted to the user in the form of radio buttons, as illustrated in the prompt 626 of FIG. 6C.

The user operating the user device 110(1) selects the radio button "coverdell" as a response 628 to the prompt 626. Based on the response 628 received from the user operating the user device 110(1), the virtual assistant server 150 identifies a matching path—Bank→Savings Account→Education→Coverdell→Open, between the above identified two qualifying paths. Finally, the virtual assistant server 150 outputs content 630—"Below is a list of documents required to open a coverdell education savings account . . . ", associated with the leaf node—"open" of the matching path to the user operating the user device 110(1).

In the example conversation of FIG. 6D, the user operating the user device 110(1) is communicating with the bank virtual assistant and provides a query 640—"What is the process to close my education account?". The virtual assistant server 150 extracts the concepts "close" and "education" from the query 640. The virtual assistant server 150 retrieves the knowledge graph 300 of the bank virtual assistant that is stored on the storage 160 and traverses the knowledge graph 300 by correlating the concepts extracted (i.e., "close" and "education") from the query 640 with the plurality of nodes corresponding to the plurality of paths of the knowledge graph 300. In this example, "close" and "education" are the concepts that are extracted from the query 640 using n-grams generation. The virtual assistant server 150 identifies that only one qualifying path—Bank→Savings Account→Education→529 Plan Close, of the plurality of paths of the knowledge graph 300 comprises the extracted concepts "close" and "education". Further, the virtual assistant server 150 derives the conversational context (i.e., "savings account") that is implicitly available in the identified qualifying path. Thus, the virtual assistant server 150 qualifies the identified qualifying path as a matching path to the query 640 and outputs content 642— "Please follow the below steps to close your 529 education savings account . . . ", associated with the leaf node— "close" of the matching path to the user operating the user device 110(1).

Thus, in view of FIGS. 6A-6C, it may be understood that based on the conversational context determination, the contextual nodes 320, the intermediate nodes 330, or the leaf nodes 340 of the two or more qualifying paths causing the traversal ambiguity may be prompted to the user for the traversal ambiguity resolution. In one example, when there are nodes causing the traversal ambiguity at different depths from the root node 310 of the knowledge graph 300, the nodes causing the traversal ambiguity at a lower depth from the root node 310 are prioritized over the nodes causing the traversal ambiguity at a higher depth from the root node 310, while prompting the user. For example, when nodes at depth-2 and depth-4 of the knowledge graph 300 are causing the traversal ambiguity, then the nodes at depth-2 are given a higher priority over the nodes at depth-4 and the nodes at the depth-2 causing the traversal ambiguity are first prompted to the user for traversal ambiguity resolution.

Thus, in the disclosed methods, systems, and non-transitory computer-readable mediums, as the contextual nodes are prioritized over the other nodes of the two or more qualifying paths, or as the nodes at the lower depth from the root node of the knowledge graph are prioritized for prompting the user for traversal ambiguity resolution, the virtual assistant server 150 may better handle and manage the conversation with the user and respond to the user query quickly and accurately. Further, the disclosed traversal ambiguity resolution methods and systems, may add more meaningful conversational sense to the user interactions with the virtual assistant server 150, which in turn enhances the conversational experience of the user when interacting with the virtual assistant server 150.

In one example, the virtual assistant server 150 may respond to the user query using the data map 400 corresponding to the knowledge graph 300. The data map 400 comprises unique_nodes, leaf_nodes and non_leaf_nodes, which are correlated, by the virtual assistant server 150, either directly or indirectly via synonyms (i.e., using node_synonym_map) to the one or more concepts extracted from the user query to identify one or more qualifying nodes from the plurality of nodes listed in the data map 400. The virtual assistant server 150 further uses the node_path_map of the data map 400 to identify one or more qualifying paths from the plurality of paths that comprise the one or more qualifying nodes. Further, when two or more qualifying paths are identified, then the virtual assistant server 150 prompts the nodes causing the traversal ambiguity between the identified two or more qualifying paths to the user based the conversational context determination or the depth of the traversal ambiguity causing nodes from the root node 310. Further, based on correlating the one or more extracted concepts to the plurality of nodes in the knowledge graph 300 and a response to the prompt received from the user, the virtual assistant server 150 identifies a matching path between the identified two or more qualifying paths. Furthermore, the virtual assistant server 150 uses the questions field in the node_path_map of the data map 400 to identify a matching question associated with the leaf node of the identified matching path and outputs content associated with the matching question to the user device 110(1).

The examples of the methods, systems, and non-transitory computer-readable mediums described herein have numerous advantages including one or more of the following exemplary advantages over the traditional knowledge graph-based techniques:

1) the plurality of virtual assistants 190(1)-190(n) of the virtual assistant server 150 may require less training data and time, which in turn reduces processor(s) execution cycles and power consumption,
2) the requirement of less training data and time reduces time-to-market,
3) the use of domain concepts (i.e., entity nodes and intent nodes) and defining parent-child relationships between the domain concepts, and prompting the nodes to the user for traversal ambiguity resolution turns static FAQs text into an intelligent, interactive, and personalized conversational experience to the user,
4) prioritizing context determination while resolving the traversal ambiguity, adds more conversational sense to the conversation, which enhances the conversational experience to the user,
5) the enablement of word importance by tagging specific words as mandatory for quick intent identification reduces false positives for the words marked as mandatory, which in turn reduces number of false positives during intent identification,
6) the use of data map instead of the knowledge graph to respond to user queries, reduces—the knowledge graph reconstruction time, the knowledge graph traversal time, and response time, and
7) reduces the number of error messages sent to the user, which in turn improves the conversational experience of the user.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method comprising:

receiving, by a virtual assistant server, a query provided via a channel of a virtual assistant rendered in a user device, wherein the virtual assistant comprises a plurality of knowledge graphs and a plurality of data maps corresponding to the plurality of knowledge graphs, and wherein each of the plurality of data maps comprises one or more mandatory terms tagged for detection in the query;

extracting, by the virtual assistant server, one or more concepts from the query;

identifying, by the virtual assistant server, one of the plurality of data maps as a matching data map when at least one of the one or more mandatory terms of the matching data map is detected in the query;

correlating, by the virtual assistant server, the one or more extracted concepts to a plurality of nodes of a plurality of paths of the matching data map;

determining, by the virtual assistant server, a traversal ambiguity between two or more qualifying paths of the plurality of paths based on the correlating;

resolving, by the virtual assistant server, the traversal ambiguity by iteratively prompting the user device with one or more of the plurality of nodes from the two or more qualifying paths and receiving one or more inputs from the user device in response to the prompting until the traversal ambiguity is resolved and a matching path to the query is identified; and outputting, by the virtual assistant server, to the user device, a response to the query determined based on the matching path.

2. The method of claim 1, wherein the query from the user device is a text-based query or a voice-based query.

3. The method of claim 1, wherein the matching data map comprises the plurality of nodes with parent-child relationships.

4. The method of claim 1, wherein each leaf node in the matching data map is associated with one or more question-content pairs.

5. The method of claim 1, wherein when a leaf node of the matching path is associated with a plurality of question-content pairs, the plurality of question-content pairs are scored against the received query and the response received from the user device after each prompt, to identify the response to the query.

6. The method of claim 1, wherein the plurality of data maps comprises mapping of the plurality of nodes, the plurality of paths, and one or more question-content pairs associated with each leaf node of the plurality of paths.

7. The method of claim 1, wherein the plurality of data maps are structured representations of the plurality of knowledge graphs comprising: node data, path data, and one or more question-content pairs associated with each path of the plurality of knowledge graphs.

8. The method of claim 1, wherein the iterative prompting prioritizes prompting two or more contextual nodes from the two or more qualifying paths over other nodes from the two or more qualifying paths when the traversal ambiguity is caused by the one or more contextual nodes and the other nodes.

9. A virtual assistant server comprising:
one or more processors; and
a memory coupled to the one or more processors which are configured to execute programmed instructions stored in the memory to:
receive a query provided via a channel of a virtual assistant rendered in a user device, wherein the virtual assistant comprises a plurality of knowledge graphs and a plurality of data maps corresponding to the plurality of knowledge graphs, and wherein each of the plurality of data maps comprises at least one mandatory term tagged for detection in the query;
extract one or more concepts from the query;
identify one of the plurality of data maps as a matching data map when at least one of the one or more mandatory terms of the matching data map is detected in the query;
correlate the one or more extracted concepts to a plurality of nodes of a plurality of paths of the matching data map;
determine a traversal ambiguity between two or more qualifying paths of the plurality of paths based on the correlating;
resolve the traversal ambiguity by iteratively prompting the user device with one or more the plurality of nodes from the two or more qualifying paths and receiving one or more inputs from the user device in response to the prompting until the traversal ambiguity is resolved and a matching path to the query is identified; and
output to the user device a response to the query determined based on the matching path.

10. The virtual assistant server of claim 9, wherein the query from the user device is a text-based query or a voice-based query.

11. The virtual assistant server of claim 9, wherein the matching data map comprises the plurality of nodes with parent-child relationships.

12. The virtual assistant server of claim 9, wherein each leaf node in the matching data map is associated with one or more question-content pairs.

13. The virtual assistant server of claim 9, wherein when a leaf node of the matching path is associated with a plurality of question-content pairs, the plurality of question-content pairs are scored against the received query and the response received from the user device after each prompt, to identify the response to the query.

14. The virtual assistant server of claim 9, wherein the plurality of data maps are structured representations of the plurality of knowledge graphs comprising: node data, path data, and one or more question-content pairs associated with each path of the plurality of knowledge graphs.

15. The virtual assistant server of claim 9, wherein the iterative prompting prioritizes prompting two or more contextual nodes from the two or more qualifying paths over other nodes from the two or more qualifying paths when the traversal ambiguity is caused by the one or more contextual nodes and the other nodes.

16. A non-transitory computer-readable medium storing instructions which when executed by a processor, causes the processor to:
receive a query provided via a channel of a virtual assistant rendered in a user device, wherein the virtual assistant comprises a plurality of knowledge graphs and a plurality of data maps corresponding to the plurality of knowledge graphs, and wherein each of the plurality of data maps comprises at least one mandatory term tagged for detection in the query;
extract one or more concepts from the query; identify one of the plurality of data maps as a matching data map when at least one of the one or more mandatory terms of the matching data map is detected in the query;
correlate the one or more extracted concepts to a plurality of nodes of a plurality of paths of the matching data map;
determine a traversal ambiguity between two or more qualifying paths of the plurality of paths based on the correlating;
resolve the traversal ambiguity by iteratively prompting the user device with one or more of the plurality of nodes from the two or more qualifying paths and receiving one or more inputs from the user device in response to the prompting until the traversal ambiguity is resolved and a matching path to the query is identified; and
output to the user device a response to the query determined based on the matching path.

17. The non-transitory computer-readable medium of claim 16, wherein the query from the user device is a text-based query or a voice-based query.

18. The non-transitory computer-readable medium of claim 16, wherein the matching data map comprises the plurality of nodes with parent-child relationships.

19. The non-transitory computer-readable medium of claim 16, wherein each leaf node in the matching data map is associated with one or more question-content pairs.

20. The non-transitory computer-readable medium of claim 16, wherein when a leaf node of the matching path is associated with a plurality of question-content pairs, the plurality of question-content pairs are scored against the received query and the response received from the user device after each prompt, to identify the response to the query.

21. The non-transitory computer-readable medium of claim 16, wherein the plurality of data maps are structured representations of the plurality of knowledge graphs comprising: node data, path data, and one or more question-content pairs associated with each path of the plurality of knowledge graphs.

22. The non-transitory computer-readable medium of claim 16, wherein the iterative prompting prioritizes prompting two or more contextual nodes from the two or more qualifying paths over other nodes from the two or more qualifying paths when the traversal ambiguity is caused by the one or more contextual nodes and the other nodes.

\* \* \* \* \*